United States Patent [19]

Jacquin et al.

[11] Patent Number: 5,764,803
[45] Date of Patent: Jun. 9, 1998

[54] MOTION-ADAPTIVE MODELLING OF SCENE CONTENT FOR VERY LOW BIT RATE MODEL-ASSISTED CODING OF VIDEO SEQUENCES

[75] Inventors: Arnaud Eric Jacquin, New York, N.Y.; Wendi Beth Rabiner, Berkeley Heights, N.J.

[73] Assignee: Lucent Technologies Inc., Murray Hill, N.J.

[21] Appl. No.: 549,994

[22] Filed: Apr. 3, 1996

[51] Int. Cl.⁶ .................................................. G06K 9/36
[52] U.S. Cl. .................................................. 382/236
[58] Field of Search .................................. 345/441, 501; 348/384, 398, 400, 402, 422, 416, 417, 418; 382/199, 232, 236, 238, 241, 243, 253, 282, 283

[56] References Cited

U.S. PATENT DOCUMENTS

| | | | |
|---|---|---|---|
| 4,218,704 | 8/1980 | Netravali | 358/136 |
| 4,232,338 | 11/1980 | Netravali et al. | 348/416 |
| 4,245,248 | 1/1981 | Netravali | 358/136 |
| 5,086,480 | 2/1992 | Sexton | 382/18 |
| 5,103,488 | 4/1992 | Gemello et al. | 382/282 |
| 5,117,287 | 5/1992 | Koike et al. | 358/133 |
| 5,136,374 | 8/1992 | Jayant et al. | 358/133 |
| 5,309,232 | 5/1994 | Hartung et al. | 348/384 |

OTHER PUBLICATIONS

A.R. Buschmann, "1.15 Mbit/s Coding of Video Signals Including Global Motion Compensation," *Signal Processing: Image Communication*, vol. 3, Nos. 2–3, Jun. 1991, pp. 259–274.

D.M. Amitay, "Global–Motion Estimation In Image sequences of 3–D Scenes For Coding Applications," *Signal Processing: Image Communication*, vol. 6, 1995, pp. 507–520.

W. Guse et al., "Effective Exploitation Of Background Memory For Coding Of Moving Video Using Object Mask Generation," *Proc. SPIE VCIP '90*, vol. 1360, 1990, pp. 512–523.

ITU–T Study Group 15, "Draft Recommendation H.263: Video Coding For Narrow Telecommunication Channels," Boston, Jun. 1995.

C. Lettera et al., "Foreground/Background Segmentation In Videotelephony," *Signal Processing: Image Communication*, vol. 1, No. 2, Oct. 1989, pp. 181–189.

F. Moscheni et al., "A New Two–Stage Global/Local Motion Estimation Based On A Background/Foreground Segmentation," *Proc. ICASSP '95*, 1995, pp. 2261–2264.

(List continued on next page.)

*Primary Examiner*—Jose L. Couso
*Attorney, Agent, or Firm*—Kenneth M. Brown

[57] ABSTRACT

A method and apparatus for video coding whereby a region of an image which includes a predetermined object such as a person's face in the foreground portion of the image is automatically determined. Specifically, the foreground portion of the image is identified, and one or more predetermined (geometric) shapes (e.g., ellipses) are compared with the shapes of objects found in the foreground portion of the image. The foreground portion of an image may be determined by performing a global motion estimation of the overall image to detect global image movement resulting, for example, from camera pan and zoom. That portion of the image whose movement is consistent with the estimated global motion may be identified as the background portion, with the remainder of the image identified as the foreground portion. The identified region of the image which includes the predetermined object and portions of the image which do not include the predetermined object may be coded with differing levels of coding accuracy (e.g., using different quantization levels), such that if the identified region contains, for example, a person's face, the quality of the coding of the face may be improved relative to the quality of the coding of other portions of the image.

20 Claims, 2 Drawing Sheets

OTHER PUBLICATIONS

C. Swain et al., "Defocus–Based Image Segmentation," *Proc. ICASSP*1995, pp. 2403–2406.

Y.T. Tse et al., "Global Zoom/Pan Estimation and Compensation For Video Compression," *Proc. ICASSP'*91, 1991, pp. 2725–2728.

J–H. Park et al., "Estimation Of Camera Parameters From Image Sequence For Model–Based Video Coding," *IEEE Trans. On Circuits And Systems For Video Tech.*, vol. 4, No. 3, Jun. 1994, pp. 288–296.

A. Eleftheriadis et al., "Model–Assisted Coding Of Video Teleconferencing Sequences At Low Bit Rates," *ISCAS 1994*, London, May–Jun. 1994, pp 177–180.

A. Jacquin et al., "Automatic Location Tracking Of Faces And Facial Features In Video Sequences," *Proc. Of International Workshop On Automatic Face And Gesture Recognition*, Zurich, Switzerland, Jun. 26–28, 1995, pp. 1–6.

D.E. Pearson, "Developments In Model–Based Video Coding," *Proc. Of The IEEE*, vol. 83, No. 6, Jun. 1995, pp. 892–906.

F. Pereira et al., "Mobile Videotelephone Communications: The CCITT H.261 Chances," *SPIE*, vol. 1977, pp. 168–179.

M. Menezes de Sequeira et al., "Knowledge–Based Videotelephone Sequence Segmentation," *SPIE*, vol. 2094, pp. 858–868.

K. Aizawa et al., "Model–Based Analysis Image Coding (MBASIC) System For A Person's Face," *Signal Processing: Image Communication*, vol. 1, No. 2, Oct. 1989, pp. 139–152.

K. Aizawa et al., "Human Facial Motion Analysis And Synthesis With Applications To Model–Based Coding," *Motion Analysis And Image Sequence Processing*, Chapter 11, Kluwer Academic Publishers, 1993, pp. 317–348.

J.S. Angiolillo et al., "Video Telephony," *AT&T Technical Journal*, vol. 72, No. 3, May/Jun. 1993, pp. 7–20.

Aravind et al., "Image And Video Coding Standards," *AT&T Technical Journal*, vol. 72, No. 1, Jan./Feb. 1993, pp. 67–80.

M. Buck, "Model–Based Image Sequence Coding," *Motion Analysis And Image Sequence Processing*, Chapter 10, Kluwer Academic Publishers, 1993, pp. 285–315.

C.S. Choi et al., "Analysis and Synthesis Of Facial Expressions In Knowledge–Based Coding Of Facial Image Sequences," *Proc. ICASSP*, 1991, pp. 2737–2740.

I. Craw et al., "Automatic Extraction Of Face Features," *Pattern Recognition Letters*, vol. 5, No. 2, Feb. 1987, pp. 183–187.

N. Diehl, "Object–Oriented Motion Estimation and Segmentation In Image Sequences," *Signal Processing: Image Communication*, vol. 3, No.1, Feb. 1991, pp. 23–56.

"Draft Revision Of Recommendation H.261: Video Codec For Audiovisual Services At p x 64 kbit/s," *Signal Processing: Image Communication*, vol. 2, No. 2, Aug. 1990, pp. 221–239.

M. A. Fischler et al., "The Representation And Matching Of Pictorial Structures," *IEEE Trans. On Computers*, Jan. 1973, pp. 67–92.

R. Forcheimer et al., "Image Coding–From Waveforms To Animation," *IEEE Trans. On Acoustics, Speech, and signal Processing*, vol. 37, No. 12, Dec. 1989, pp. 2008–2023.

V. Govindaraju et al., "Locating Human Faces In Newspaper Photographs,"*Proc. IEEE Computer Society Conference On Computer Vision And Pattern Recognition*, Jun. 1989, pp. 549–554.

V. Govindaraju et al., "A Computational Model For face Location," *Proc. Third International Conference On Computer Vision*, Dec. 1990, pp. 718–721.

M. Hotter et al., "Image Segmentation Based On Object–Oriented Mapping Parameter Estimation," *Signal Processing*, vol.15, No. 3, Oct. 1988, pp. 315–334.

C. Podilchuk et al., "Geometric Vector Quantization For Subband–Based Video Coding," *DIMAC Series In Discrete Mathematics And Theoretical Computer Science*, vol. 14, 1993, pp. 243–251.

A. Jacquin et al., "Very Low Bit Rate 3D Subband–Based Video Coding With A Dynamic Bit Allocation," *Proc. International Symposium on Fiber Optic Networks and Video Communications*, Apr. 1993, pp. 156–167.

M. Kunt et al., "Second–Generation Image Coding Techniques," *Proc. IEEE*, vol. 73, No. 4, Apr. 1985, pp. 549–574.

M. Liou, "Overview Of The px64 kbit/s Video Coding Standard," *Communications of the ACM*, vol. 34, No. 4, Apr. 1991, pp. 60–63.

H.G. Musmann et al., "Object–Oriented Analysis–Synthesis Coding Of Moving Images," *Signal Processing: Image Communication*, vol. 1, No. 2, Oct. 1989, pp. 117–138.

Y. Nakaya et al., "Model–Based/Waveform Hybrid Coding For Videotelephone Images," *Proc. ICASSP*, 1991, pp. 2741–2744.

Y. Nakaya et al., "Model–Based/waveform Coding for Low– Rate Transmission Of Facial Images," *IEICE Trans. on Communications*, vol. E75–B, No. 5, May 1992, pp. 377–384.

T. Pavlidis, *Structural Pattern Recognition*, Springer–Verlag, 1977, pp. 1–10; 297–302.

MOTION-ADAPTIVE MODELLING OF SCENE CONTENT FOR VERY LOW BIT RATE MODEL-ASSISTED CODING OF VIDEO SEQUENCES

FIELD OF THE INVENTION

The present invention relates generally to the field of video signal coding and more particularly to the coding of video signals for use in video communications at low bit rates.

BACKGROUND OF THE INVENTION

The coding of video signals for efficient transmission and/or storage has received a great deal of recent attention, particularly with the growing interest in technologies such as HDTV (High Definition Television) and Interactive Television (e.g., "video-on-demand"). In fact, video coding algorithms have been standardized for many of these applications (e.g., Motion Picture Experts Group standards such as MPEG-1 and MPEG-2). These applications, however, typically involve the coding of video signals at relatively high bit rates.

At low bit rates, such as are used in video teleconferencing and video telephony applications, coding artifacts are often present throughout the coded images. These artifacts result from the fact that having a low number of bits available to code each frame reduces the quality of the coding that can be performed. Typically, the artifacts tend to affect various areas of the image without discrimination. Viewers, however, tend to find coding artifacts to be much more noticeable in areas of particular interest to them. In typical video teleconferencing or telephony applications, for example, the viewer will tend to focus his or her attention to the face(s) of the person(s) on the screen, rather than to other areas such as clothing and background. Moreover, even though fast motion in a coded image is known to mask coding artifacts, the human visual system has the ability to "lock on" and "track" particular moving objects in a scene, such as a person's face. For the above reasons, communication between users of very low bit rate video teleconferencing and telephony systems tend to be more intelligible and psychologically pleasing to the viewers when facial features are not plagued with too many coding artifacts.

In "Model-Assisted Coding of Video Sequences at Low Bit Rates" by A. Eleftheriadis and A. E. Jacquin, Ser. No. 08/250,251, filed on May 27, 1994 and assigned to the assignee of the present invention, it was recognized that in video teleconferencing and telephony applications, for example, the coding quality of certain regions of a video image (e.g., those containing a predetermined object such as a person's face) is significantly more important than the coding quality of other areas of the scene. In particular, and in accordance with an illustrative embodiment of the invention disclosed therein, a region of an image which includes a predetermined object such as a person's face may be automatically determined by comparing one or more predetermined (geometric) shapes (e.g., ellipses of various dimensionality) with the shapes of objects found in the image. That is, the predetermined object is "modelled" by a set of one or more geometric shapes. When a good "match" is found, it may be presumed that the object in the image is, in fact, the predetermined object (e.g., a person's face). The determined region, presumed to include the predetermined object, may then be coded with, for example, a higher quality coder than might be used for coding other areas of the image. "Model-Assisted Coding of Video Sequences at Low Bit Rates" is hereby incorporated by reference as is fully set forth herein.

SUMMARY OF THE INVENTION

It has been recognized that, even though the technique described in the above-identified patent application works well for images which do not contain complex spatio-temporal backgrounds (i.e., cluttered static backgrounds and moving backgrounds due, for example, to camera motion or zoom), when such complex backgrounds are present, the technique may erroneously identify portions of the background as comprising the predetermined object (e.g., a person's face). Thus, in accordance with the present invention, a method of coding an image is provided whereby a region of an image which includes a predetermined object such as a person's face in the foreground portion of the image is automatically determined. Specifically, the foreground portion of the image is first automatically identified, and then, one or more predetermined (geometric) shapes (e.g., ellipses of various dimensionality) are compared with the shapes of objects found in the foreground portion of the image.

In accordance with one illustrative embodiment of the present invention, the foreground portion of an image may be determined by comparing successive frames of the video sequence to determine that portion of the image which does not remain stationary. That is, the portion of the image which does not move between successive frames is identified as the background portion, and the remainder of the image is correspondingly identified as the foreground portion. Clearly, this approach is well suited to scenes having static, albeit complex, backgrounds.

In accordance with another illustrative embodiment of the present invention, the foreground portion of an image may be determined by performing a global motion estimation of the overall image to detect global image movement resulting, for example, from camera pan (e.g., uniform horizontal and/or vertical motion) and zoom (i.e., increased or decreased magnification). Then, that portion of the image whose movement is consistent with the estimated global motion may be identified as the background portion, and the remainder of the image may be identified as the foreground portion.

In accordance with certain illustrative embodiments of the present invention, the identified region of the image which includes the predetermined object and other portions of the image (i.e., those which do not include the predetermined object) are coded with differing levels of coding accuracy (e.g., using different quantization levels). In particular, the region of the image which includes the predetermined object is coded with a smaller coding error than the other regions of the image. In this manner, if the identified region contains, for example, a person's face, the quality of the coding of the face will be improved relative to the quality of the coding of less critical portions of the image (e.g., the background and less critical portions of the foreground), while nonetheless reducing the required bit rate (as compared to coding the entire image with the higher level of coding quality).

DETAILED DESCRIPTION

Figure 1:
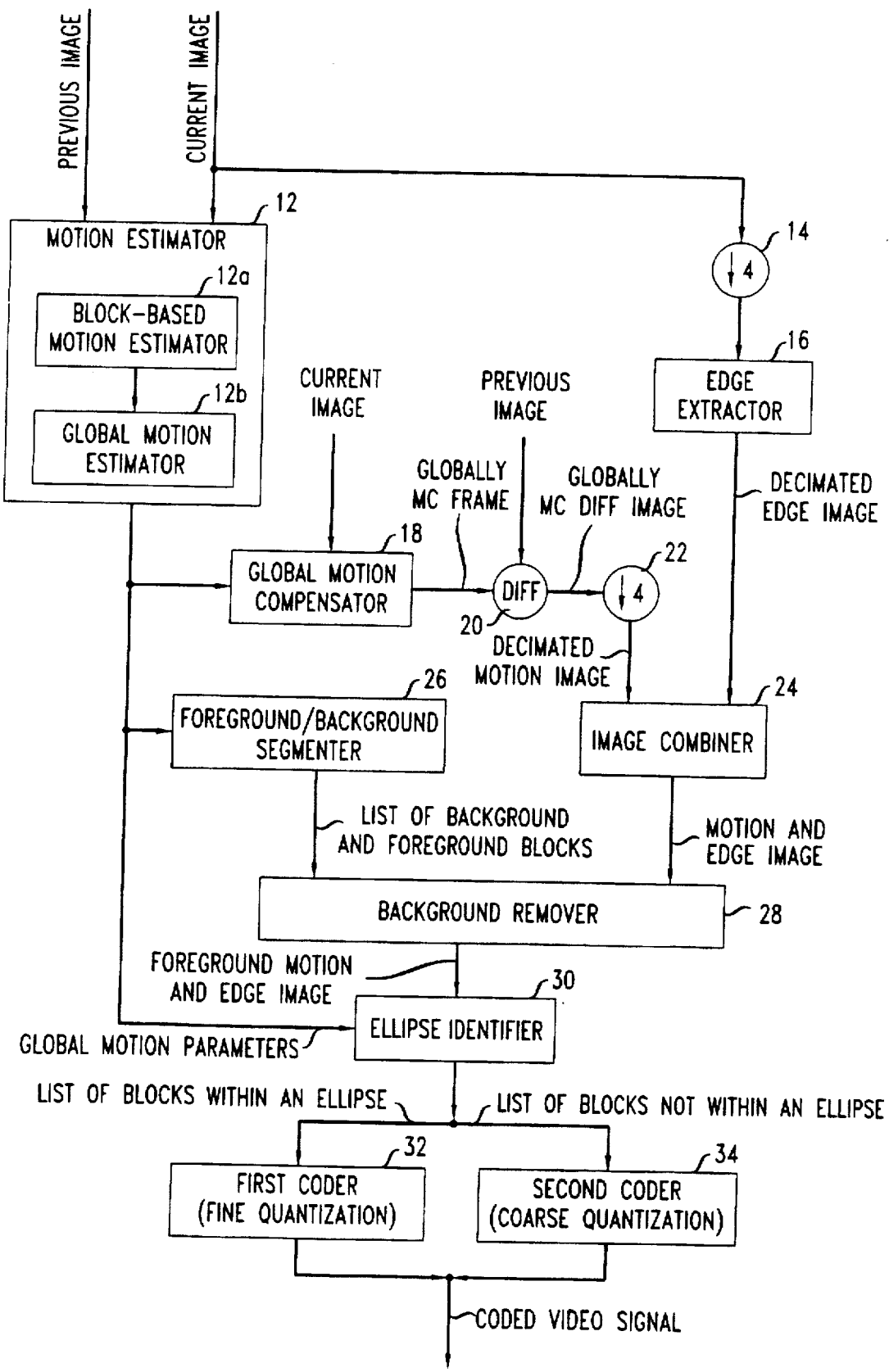
FIG. 1 shows a block diagram of a video coder employing motion-adaptive modelling of scene content in accordance with an illustrative embodiment of the present invention.

FIG. 1 shows a block diagram of a video coder employing motion-adaptive modelling of scene content in accordance with an illustrative embodiment of the present invention. This illustrative system provides for the detection and tracking of objects of interest, such as human faces and bodies, in video sequences. Specifically, knowledge about scene sequence content in the form of global background motion estimation is obtained and is advantageously used to perform background removal for improved tracking of the objects of interest. The use of such background removal techniques is particularly advantageous in cases of complex spatio-temporal scene backgrounds, such as those which typically occur with video data acquired from a hand-held video camera (e.g., in a mobile situation). After the background has been eliminated, the illustrative system matches predetermined shapes (e.g., ellipses of various sizes and shapes) to the edges in the foreground of the image, in order to locate (and thereby subsequently track) one or more predetermined objects of interest (e.g., human heads and faces). When these objects in the image have been located, the illustrative video coder codes that portion of the image included within the located object(s) with a relatively high quality coder (e.g., with use of a fine quantizer) and codes that portion of the image outside the located object(s) with a relatively low quality coder (e.g., with use of a coarse quantizer). In this manner, a perceptually high quality coding is achieved with a relatively limited bit rate.

Specifically, the illustrative video coding system of FIG. 1 includes motion estimator 12, decimator 14, edge extractor 16, global motion compensator 18, differencer 20, decimator 22, image combiner 24, foreground/background segmenter 26, background remover 28, ellipse identifier 30, first coder 32 and second coder 34. Motion estimator 12 comprises block-based motion estimator 12a and global motion estimator 12b, and illustratively operates in accordance with the known technique proposed in "Global zoom/pan estimation and compensation for video compression" by Y. T. Tse and R. L. Baker, *Proc. ICASSP '91*, pp. 2725–2728, 1991, which is hereby incorporated by reference as if fully set forth herein. In other illustrative embodiments of the present invention, other conventional techniques may be used to estimate the global motion of the video scene. (Other illustrative embodiments of the present invention may not estimate global scene motion at all, but may presume that the background is static—see discussion of foreground/background segmenter 26 below. These embodiments are well suited for use in teleconferencing applications using fixed, stationary video cameras.)

In the illustrative embodiment described herein, motion estimator 12 determines the dominant global motion of the scene, modelled as a combination of camera zoom (caused by a change of the focal length of the camera) and pan (caused by camera rotation about an axis parallel to the image plane). It is advantageously assumed that the motion of the scene background is, in fact, the dominant motion—a very reasonable assumption for a wide range of video material—with the independent motion of foreground objects treated as uncorrelated "noise." Portions of the image with local motion characteristics which are incompatible with the dominant global motion model may therefore be advantageously classified as "foreground" portions of the image.

Specifically, the global motion parameters (i.e., the estimates of the camera pan and zoom) produced by motion estimator 12 are generated by an iterative procedure which makes use of conventional block-based motion vectors obtained by traditional block-based motion estimation techniques well known to those skilled in the art. For example, the full-search motion estimation algorithm with half-pixel accuracy described in ITU-T Study Group 15, "Draft recommendation H.263: Video coding for narrow telecommunication channels," Boston, June 1995, which provides 16×16 and 8×8 motion vectors in its "Advanced Prediction" mode, may be used for the purpose of producing the block-based motion vectors. In particular, block-based motion estimator 12a is used to determine, for each block of the current frame, the best matching block in the previous frame. This local motion estimation can be modelled by the translational coordinate transformation for the pixels in block i:

$$U_i = U_i' + d_i \qquad (1)$$

where $U_i$ and $U_i'$, respectively, denote the coordinates of a pixel in the current and previous frames, and where $d_i$ is the block-based (local) motion vector for block i. It is well known (see, e.g., Tse and Baker, referenced above) that global background motion from zoom and pan can be modelled by the following coordinate transformation:

$$\hat{U}_i = f_z U_i' + p \qquad (2)$$

where $f_z$ is a camera zoom factor ($f_z > 1$ indicates that the camera is "zooming out"), p is a two-dimensional pan vector, and $\hat{U}_i$ is an estimate of the coordinates of a pixel in the globally motion-compensated block in the previous frame. This transformation is affine and can be written in matrix form as:

$$\begin{pmatrix} x \\ y \\ 1 \end{pmatrix} = \begin{bmatrix} f_z & 0 & p_x \\ 0 & f_z & p_y \\ 0 & 0 & 1 \end{bmatrix} \begin{pmatrix} x' \\ y' \\ 1 \end{pmatrix} \qquad (3)$$

Equivalently, equation (2) applied to the center pixel of block i provides an estimate $\hat{d}_i$ of the global motion vector for this block:

$$\hat{d}_i = (f_z - 1) U_i' + p \qquad (4)$$

Global motion estimator 12b approximates the global zoom and pan parameters, unknown a priori, by iteratively minimizing a conventional error metric, E. This error metric may, for example, comprise the sum of the squares of the differences between the estimated global motion vectors and the individual (known) local motion vectors:

$$E = \Sigma \|e_i\|^2 \qquad (5)$$

where $$e_i = \hat{d}_i - d_i \qquad (6)$$

In particular, the minimization procedure yields the following estimates of zoom and pan at the k'th iteration.

$$f_{z_k} = \frac{\sum_i \langle U_i, U_i' \rangle - \frac{1}{N_k} \left( \sum_i U_i, \sum_i U_i' \right)}{\sum_i \langle U_i', U_i' \rangle - \frac{1}{N_k} \left( \sum_i U_i', \sum_i U_i' \right)} \qquad (7)$$

$$p_k = \frac{1}{N_k} \left( \sum_i U_i - f_{z_k} \sum_i U_i' \right) \qquad (8)$$

where <–, –> denotes the Euclidean inner product. The initial estimates for $f_z$ and p (i.e., at k=0) are computed with the summations taken over all local motion vectors, whereas for subsequent iterations (i.e., for k>0), only those blocks ($N_k$ in number) for which the magnitude of the error vector $e_i$ is smaller than a given threshold, $T_k$, are used. This is done in order to prevent the biasing of the estimates by the independent motion of foreground objects and to progressively refine the global motion parameter estimates. (For example, given an image in the well known Quarter Common Intermediate Format—QCIF—in which the image size is 176×144 pixels, $N_0$, the total number of 8×8 blocks is equal to 396 minus the number of blocks which have been coded in "intra" mode and thereby do not have local motion vectors associated therewith. Note also that motion-compensated 16×16 blocks, as coded by the well known hierarchical motion compensation technique of the above-mentioned H.263 recommendation, are treated as four individual 8×8 blocks having identical motion vectors.)

Returning to the discussion of the iterative procedure performed by motion estimator 12, the number of iterations may either be fixed or may depend on the resultant value of the error metric, E. For example, using a fixed number of iterations, the threshold $T_k$ may be chosen to decrease with iteration number according to a given formula, such as:

$$T_k = T_{max}/k, \text{ for } k \in \{1, 2, 3\} \quad (9)$$

where the upper-bound, $T_{max}$, of this threshold may, for example, depend on a measure of the overall scene complexity. (For example, when coding typical teleconferencing scenes with one or more people in the image, a value of $T_{max}$ equal to 1 pixel may be advantageously used. When coding more general scenes with complex moving backgrounds, a value of $T_{max}$ equal to 3 pixels may be advantageously used.) The final estimates $f_z$ and p may, for example, be obtained after as few as three iterations, which is typically sufficient to allow convergence of the estimates to an accurate description of the global motion, while nonetheless limiting computational complexity.

Once the global motion of the scene has been estimated, foreground/background segmenter 26 produces a separation between scene background and foreground objects by comparing the final error between the local and global motion predictions for each block. Blocks for which this error is smaller than a "tight" threshold, $T_{final}$, are advantageously classified as belonging to the scene background. $T_{final}$ may, for example, be based on the number of blocks that matched the background in the final iteration used to compute the global motion parameters (e.g., $N_3$), according to:

$$T_{final} = \begin{cases} T_1, \text{ if } N_3 < \frac{N_0}{8} \\ T_2, \text{ if } \frac{N_0}{8} \leq N_3 < \frac{3N_0}{8} \\ T_3, \text{ if } \frac{3N_0}{8} \leq N_3 < \frac{5N_0}{8} \\ T_4, \text{ if } N_3 \geq \frac{5N_0}{8} \end{cases} \quad (10)$$

The use of the above equation provides a method of constraining the number of background blocks to be neither excessively small nor excessively large.

In the illustrative embodiment of the present invention described herein, the consistency of the foreground/background separation is further enhanced by the use of non-linear filtering techniques in foreground/background segmenter 26. In particular, blocks which have been otherwise identified as foreground blocks are switched so as to be identified as background blocks if they are almost completely surrounded by blocks which have been identified as background blocks; and blocks which have been otherwise identified as background blocks are switched so as to be identified as foreground blocks if they are almost completely surrounded by blocks which have been identified as foreground blocks. (For example, if either all eight of the surrounding blocks or all eight of the surrounding blocks except for at most one of the four corner blocks has been identified as being of the opposite type of the center block, the identification of the center block is switched.) Moreover, blocks corresponding to areas uncovered by a camera pan or camera zoom-out may be advantageously classified as background blocks regardless of their initial identification.

A combined motion-and-edge image is created by image combiner 24 by overlaying a decimated edge image onto a globally motion-compensated decimated difference image (which is referred to herein as motion data). Illustratively, the decimated edge image is the result of the decimation by 4 of an original QCIF luminance image (performed by decimator 14) followed by the application of conventional Sobel edge detection (performed by edge extractor 16), which is well known to those skilled in the art. The motion data is illustratively produced by global motion compensator 18 applied to the original QCIF luminance image using the estimated global motion parameters generated by motion estimator 12, followed by thresholding the error image. (The threshold may, for example, be fixed, and may illustratively be set equal to 10.) Pixels with an absolute value larger than the threshold are considered foreground motion. The resulting (binary-valued) globally motion-compensated difference image (produced by differencer 20) is then decimated by 4 (by decimator 22). A pixel in the decimated motion data image may be classified as "foreground" if the number of foreground pixels in the corresponding 4×4 block before decimation is greater than a predetermined population threshold. For typical teleconferencing scenes, this threshold may be illustratively set equal to 4. For more general scenes, the threshold may be illustratively set equal to 8.

The decimated motion image and edge image are finally combined by image combiner 24 to produce a ternary-valued motion-and-edge image, where each pixel can have one of three values, $b_0$, $b_1$, or $b_2$, where $$b_0 < b_1 < b_2 \quad (11)$$

These values may illustratively be set such that $b_0 = 0$, $b_1 = 128$ and $b_2 = 255$. Specifically, edge data pixels are first set to $b_2$, motion data pixels are then set to $b_1$ (unless they also belong to the edge data in which case they are left unchanged), and the remaining pixels are set to $b_0$ (the default value).

Given the combined motion-and-edge image data generated by image combiner 24, the data in areas classified as background as a result of the foreground/background segmentation performed by foreground/background segmenter 26 is "erased" (i.e., reset to $b_0$) by background remover 28, in order to create a motion-and-edge image limited to the foreground only (i.e., a foreground motion and edge image). In this manner, foreground objects such as a person's head or face may be advantageously identified and tracked by ellipse identifier 30.

Figure 2:
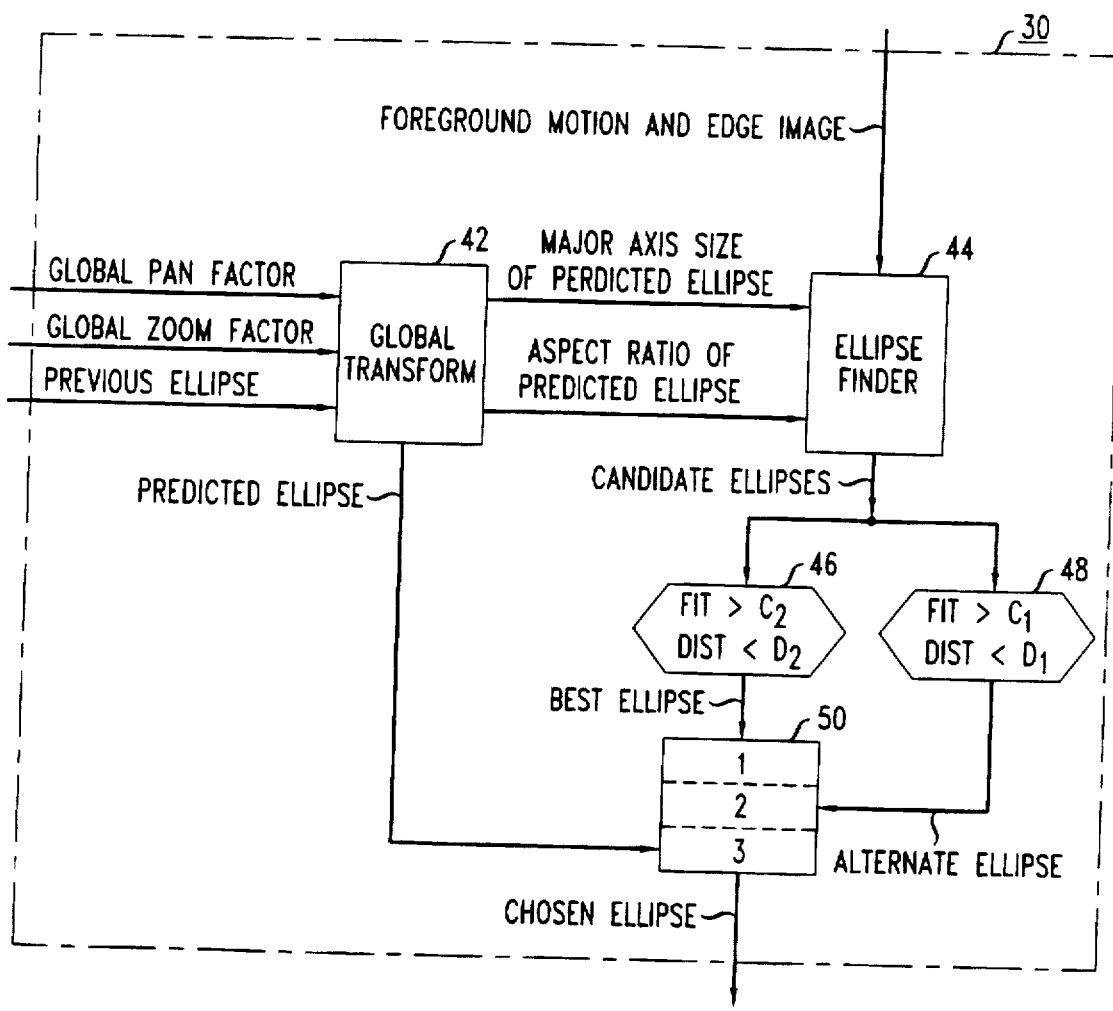
FIG. 2 shows a block diagram of the ellipse identifier of the illustrative video coder of FIG. 1.

FIG. 2 shows a block diagram of ellipse identifier 30 of the illustrative video coder of FIG. 1. Specifically, ellipse finder 44 generates candidate ellipses based on the foreground motion-and-edge image data generated by background remover 28. A maximum number of objects (e.g., faces or human bodies) that the ellipse identifier will locate (and track) may be specified a priori. (In the present illustrative embodiment this number may be set, for example, to 4.) In particular, ellipse finder 44 looks for (up to the maximum number of) "best elliptical fits" to the clumps of motion-and-edge data present in the input image. As pointed out above, ellipse matching provides an effective way to capture the locations of human heads. In addition, vertically elongated ellipses can also be advantageously used to capture the outline of a standing human body. The elliptical templates which are matched to the input data illustratively have an (elliptical-shaped) border having a thickness of approximately 2 pixels. (An elliptical border having a thickness of 2 pixels may, for example, be realized by imagining a square region of 5×5 pixels centered on a given pixel of interest. If the given pixel of interest is, in fact, within the ellipse, but at least one of the pixels in the aforementioned square region is not within the ellipse, the given pixel may be considered to be on the border of the ellipse.)

Ellipse finder 44 advantageously makes use of a "fitness metric," F, which is computed for each given candidate ellipse as the sum of three quantities:

$$F = d_{border} + d_{motion} + P_{motion} \quad (12)$$

where $d_{border}$ comprises a measure of the density of edge data on a candidate ellipse border (i.e., the percentage of the pixels on the border which have been classified as edge pixels by being assigned the value $b_2$). $d_{motion}$ indicates the density of motion data inside the ellipse (i.e., the percentage of the pixels on the border and within the border which have been classified as motion pixels by being assigned the value $b_1$), and $P_{motion}$ indicates the percentage of motion data inside the ellipse relative to a given window of a predetermined size which includes the ellipse (i.e., the number of pixels on the border and within the border which have been classified as motion pixels by being assigned the value $b_1$, divided by the number of pixels in the given window). When the scene of interest contains a single person in the foreground, the given window used to determine $P_{motion}$ may advantageously comprises the entire image, but when multiple people populate the foreground, the given window may be advantageously smaller than the entire image. For example, in the latter case, the window may illustratively be centered on the (center of the) ellipse, and have a width equal to one half the width of the input image, with a height equal to that of the entire image.

Note that each of the terms that constitute F are non-negative and upper-bounded by one, so that its maximum value, $F_{max}$, is equal to 3. In particular, $d_{border}$ measures the contribution of edge data shaped as elliptical arcs, and may advantageously be required to have a value of at least 0.2 in order for a given ellipse to be considered at all. Meanwhile, $d_{motion}$ and $P_{motion}$ measure, in an absolute and a relative sense, respectively, the contribution of motion data organized in elliptical clumps.

The ellipse identifier uses the best-fitting ellipses from the previous frame and transforms them under the affine zoom and pan transformation of equation (3) above in order to obtain a prediction of where these ellipses should be expected in the current frame, under the assumption that they each moved in synchronization with the global motion of the background. This both enables ellipse finder 44 to advantageously limit its search in the present frame to the portions of the image where the ellipses are most likely to be found, and also provides for a predicted ellipse in case the foreground motion-and-edge data disappears. This latter circumstance corresponds to the situation where, for example, the person has stopped moving (in the case of a still background), or, more generally, where the person is, in fact, moving in synchronization with the moving background. Specifically, for a given ellipse in the previous frame, the ellipse having Cartesian equation:

$$ax^2 + 2bxy + cy^2 + 2dx + 2ey + f = 0 \quad (13)$$

which can equivalently be written in matrix form as:

$$\begin{pmatrix} x \\ y \\ 1 \end{pmatrix}^T \begin{bmatrix} a & b & d \\ b & c & e \\ d & e & f \end{bmatrix} \begin{pmatrix} x \\ y \\ 1 \end{pmatrix} = 0 \quad (14)$$

the equation of the corresponding transformed ellipse is simply obtained by:

$$\begin{pmatrix} x' \\ y' \\ 1 \end{pmatrix}^T \begin{bmatrix} f_z & 0 & 0 \\ 0 & f_z & 0 \\ p_x & p_y & 1 \end{bmatrix} \begin{bmatrix} a & b & d \\ b & c & e \\ d & e & f \end{bmatrix} \begin{bmatrix} f_z & 0 & p_x \\ 0 & f_z & p_y \\ 0 & 0 & 1 \end{bmatrix} \begin{pmatrix} x' \\ y' \\ 1 \end{pmatrix} = 0 \quad (15)$$

Ellipse identifier 30 keeps track of certain information obtained from the previous frame—namely, (a) the location of objects of interest, (b) the size and shape of these objects (e.g., the major axis size and aspect ratio for elliptical object models), and (c) the number of objects of interest including possible occlusions of one object by another, as well as objects entering and leaving the scene. Based on this information, the ellipse identifier adapts the search range of the ellipse parameters in the current frame. For example, ellipse finder 44 may advantageously limit its search for candidate ellipses to an area surrounding the expected location of ellipses identified in the previous frame, on the assumption that any given object is not likely to move too far (relative to the background) from one frame to the next. Moreover, ellipse finder 44 may advantageously also limit the set of candidate ellipses (e.g., the size and shape of the ellipse) which are matched to the current frame data, based on the identified ellipses from the previous frame.

In particular, global transform 42 uses the global motion parameters in combination with the above described information regarding the objects of interest (i.e., the ellipses) from the previous frame, in order to predict the expected location (in the current frame) of each of the ellipses being tracked (i.e., each of the ellipses identified in the previous frame). Then, based on these predicted locations, ellipse finder 44 searches for the actual locations of ellipses. This search may, for example, comprise scanning the foreground motion-and-edge image data (within areas surrounding the locations of the predicted ellipses) to locate the edges of objects in the image and to determine advantageous locations at which to position the top of an ellipse for matching with the image. Then, ellipses of various sizes—that is, various lengths and aspect ratios (width divided by height)—may be positioned at the determined locations and evaluated for, inter alia, fitness with use of, for example, the fitness metric, F, as described above.

If the a priori specified maximum number of fits (set to 4 in this illustrative embodiment—see above) was not found for the previous frame, the entire range of ellipse parameters is searched to determine the presence of other objects of interest. In order for ellipse finder 44 to determine that an additional object of interest (e.g., a new person's head) has entered the scene, the object must be far enough away from all the other objects to ensure that a new, distinct object has been found. To determine occlusions of one object by another, ellipse finder 44 checks the separation between the centers of the ellipses. If this separation is small (indicating occlusion) one of the ellipses (e.g., the smaller of the two) is removed, as the tracking of one ellipse will, at least initially, suffice to track the two objects. If the two objects later separate, the previously occluded object will again be independently tracked. Similarly, it may be determined that an object is leaving the scene when the center of the predicted object localization is close to any edge of the scene. If this occurs, the ellipse may be removed and the ellipse finder notes that there is one fewer object of interest present in the scene. If the object returns to the scene, the ellipse finder will once again begin tracking its motion.

The final ellipse selection process relies jointly on measures of fitness and on the rules described above. Each candidate ellipse has associated therewith both a fitness measure, F, as defined above, and a separation measure, D, which equals the distance (in pixels) between the candidate ellipse and the predicted location of the ellipse (based on the globally motion-compensated previous frame), also as described above. These two characteristic parameters are used to find a "best" ellipse and an "alternate" ellipse (for each predicted ellipse), based on certain required threshold values of each parameter.

Specifically, two fitness thresholds, $C_1$ and $C_2$ are used, wherein:

$$0 < C_2 < C_1 < F_{max} \quad (16)$$

$C_1$ and $C_2$ differentiate "very high" and merely "high" fitness measures, respectively. Illustratively, $C_1$ may be set equal to 1.6 and $C_2$ may be set equal to 1.4. In addition, two separation thresholds $D_1$ and $D_2$ are used, wherein:

$$D_2 < D_1 \quad (17)$$

These separation thresholds limit the magnitude of the motion between ellipse centers in two consecutive frames. The values of these thresholds may be advantageously chosen to depend on the temporal sampling rate of the video input—that is, the higher the frame rate, the smaller the thresholds. Illustratively, $$D_1 = (f_s/3) + 8 \text{ and } D_2 = (f_s/3) + 2 \quad (18)$$

where $f_s$ denotes the number of frames skipped in a video sequence initially sampled, for example, at 30 frames per second to obtain a video input downsampled to a constant number of frames per second, such as, for example, 5 frames per second. By using such an approach in calculating $D_1$ and $D_2$, tracking may be made consistent from frame to frame.

For each object of interest, the selection process goes through an ordered list of candidate ellipses as shown in FIG. 2. The first choice, selected, when available, by decision box 46, corresponds to a relatively high fitness value (i.e., $C > C_2$), and a relatively small separation between the centers of the previous and current ellipse (e.g., face or body) locations (i.e., $D < D_2$)—a combination which the procedure may choose with highest confidence. The second choice, selected, when available, by decision box 48, corresponds to a "very high" fitness value (i.e., $C > C_1$), and a relatively modest separation between ellipse locations (i.e., $D < D_1$). The third choice is the predicted ellipse based on the previous image and on the estimated global motion parameters, as generated by global transform 42. (Of course, this third choice can only be available if an object of interest was present in the previous image.) Each of these three choices (if available), for each of the objects of interest, may be stored in memory 50, with the choices of highest precedence (for each object of interest) being supplied as output from ellipse identifier 30.

Returning now to FIG. 1, ellipse identifier 30 of the illustrative video coder produces a list of the blocks that are contained within (any) one of the chosen ellipses, and a complementary list of the blocks that are not contained within any of the chosen ellipses. The former list is provided to first coder 32 whereas the latter list is provided to second coder 34. First coder 32 performs conventional (e.g., transform) coding of those blocks that were determined to be within one of the chosen ellipses, with use of a conventional quantizer having a relatively fine quantization level; second coder 34 performs conventional (e.g., transform) coding of those blocks that were determined not to be within one of the chosen ellipses, with use of a conventional quantizer having a relatively coarse quantization level. For example, assuming a conventional motion-compensated DCT (Discrete Cosine Transform) coder based on ITU-T Recommendation H.263, for example, the second coder may employ a uniform quantizer having a step size which is illustratively 2–4 times that of the uniform quantizer employed by the first coder. Of course, as will be familiar to those skilled in the art, the actual step sizes used by the corresponding quantizers will be dependent upon a number of factors, including, for example, the available bit allocation in accordance with the H.263 recommendation.

Illustrative coding systems in accordance with the present invention may also advantageously incorporate a number of additional, conventional features such as, for example, prefiltering, adaptive VQ (i.e., vector quantization), and postfiltering, each of which is familiar to those of ordinary skill in the art. Moreover, a video coder in accordance with the present invention may accomplish the above-described differential coding (i.e., coding those portions of the image which have been identified to be objects of interest with a higher quality coding than other portions of the image) with use of a rate control module which allocates a higher coding rate to the areas of interest (i.e., those within the chosen ellipses) by "diverting" the allocation of bits from the remaining areas. Specifically, such an approach to differential coding is described in "Automatic Face and Facial Feature Location Detection for Low Bit Rate Model-Assisted H.261 Compatible Coding of Video" by A. Eleftheriadis and A. E. Jacquin, Ser. No. 08/500,672, filed on Jul. 10, 1995 and assigned to the assignee of the present invention. "Automatic Face and Facial Feature Location Detection for Low Bit Rate Model-Assisted H.261 Compatible Coding of Video" is hereby incorporated by reference as if fully set forth herein.

Illustrative coding systems in accordance with the present invention may also be run at a variety of different coding rates and video input resolutions. They can also operate under different modes, including either constant frame rate output (CFR) or variable frame rate output (VFR) for challenging material such as scenes with complex moving backgrounds. The implementation of each of these illustrative embodiments of the present invention as mentioned herein will be obvious to those skilled in the art given the content of the present disclosure and of the prior art.

Although a number of specific embodiments of this invention have been shown and described herein, it is to be understood that these embodiments are merely illustrative of the many possible specific arrangements which can be devised in application of the principles of the invention. Numerous and varied other arrangements can be devised in accordance with these principles by those of ordinary skill in the art without departing from the spirit and scope of the invention.

We claim:

1. A method of coding a video signal, the video signal comprising a succession of frames, a given one of the frames comprising an image including a foreground portion and a background portion, the foreground portion of the image of the given frame including a predetermined object, the method comprising the steps of:

automatically determining the foreground portion of the image of the given frame;

automatically determining a region of interest within the foreground portion of the image of the given frame, said region of interest including at least a portion of the predetermined object, by matching one or more predetermined shapes to the predetermined object in the foreground portion of the image of the given frame;

coding the determined region of interest with a first coder, the first coder having a first coding error; and coding at least a portion of the image of the given frame, which portion excludes the determined region of interest, with a second coder, the second coder having a second coding error, wherein said first coding error is smaller than said second coding error.

2. The method of claim 1 wherein the step of determining the region of interest comprises performing edge extraction on at least a portion of the image of the given frame to determine a shape of the predetermined object in the foreground portion of the image.

3. The method of claim 1 wherein the step of determining the foreground portion of the image of the given frame comprises comparing the image of the given frame with an image comprised in a frame previous to the given frame, and determining a portion of the image of the given frame which has moved relative to a corresponding portion of the frame previous to the given frame.

4. The method of claim 1 wherein the step of determining the foreground portion of the image of the given frame comprises determining one or more global motion estimation parameters based on a comparison of the image of the given frame with an image comprised in a frame previous to the given frame, determining a background portion of the image of the given frame, said background portion having exhibited motion in accordance with said one or more global motion estimation parameters as applied to a corresponding portion of the frame previous to the given frame, and determining the foreground portion of the image of the given frame based on the determined background portion.

5. The method of claim 1 further comprising the steps of determining one or more global motion estimation parameters based on a comparison of the image of the given frame with an image comprised in a frame subsequent to the given frame, determining a search region of the image of the frame subsequent to the given frame based on the determined region of interest of the image of the given frame and on said one or more global motion estimation parameters, automatically determining a region of interest of the frame subsequent to the given frame, said region of interest of the frame subsequent to the given frame including at least a portion of the predetermined object, by matching at least one of said one or more predetermined shapes to the predetermined object within the search region of the image of the subsequent frame, coding the determined region of interest of the image of the frame subsequent to the given frame with the first coder, and coding at least a portion of the image of the frame subsequent to the given frame, which portion excludes the determined region of interest of the image of the frame subsequent to the given frame, with the second coder.

6. The method of claim 1 further comprising the steps of determining one or more global motion estimation parameters based on a comparison of the image of the given frame with an image comprised in a frame subsequent to the given frame, selecting at least one of said one or more predetermined shapes based on the determined region of interest of the image of the given frame and on said one or more global motion estimation parameters, automatically determining a region of interest of the frame subsequent to the given frame, said region of interest of the frame subsequent to the given frame including at least a portion of the predetermined object, by matching the selected at least one of said one or more predetermined shapes to the predetermined object in the image of the subsequent frame, coding the determined region of interest of the image of the frame subsequent to the given frame with the first coder, and coding at least a portion of the image of the frame subsequent to the given frame, which portion excludes the determined region of interest of the image of the frame subsequent to the given frame, with the second coder.

7. The method of claim 1 further comprising the steps of determining one or more global motion estimation parameters based on a comparison of the image of the given frame with an image comprised in a frame subsequent to the given frame, determining a region of interest of the image of the frame subsequent to the given frame based on the determined region of interest of the image of the given frame and on said one or more global motion estimation parameters, coding the determined region of interest of the image of the frame subsequent to the given frame with the first coder, and coding at least a portion of the image of the frame subsequent to the given frame, which portion excludes the determined region of interest of the image of the frame subsequent to the given frame, with the second coder.

8. The method of claim 1 wherein the predetermined object comprises a person's head and wherein each of the one or more predetermined shapes comprises an ellipse.

9. The method of claim 1 wherein the predetermined object comprises a person's body and wherein each of the one or more predetermined shapes comprises an ellipse.

10. The method of claim 1 wherein the first coder comprises a waveform coder having a first quantizer and the second coder comprises a waveform coder having a second quantizer, the first quantizer providing a finer quantization than the second quantizer.

11. A video coder for coding a video signal, the video signal comprising a succession of frames, a given one of the frames comprising an image including a foreground portion and a background portion, the foreground portion of the image of the given frame including a predetermined object, the apparatus comprising:

means for automatically determining the foreground portion of the image of the given frame;

means for automatically determining a region of interest within the foreground portion of the image of the given frame, said region of interest including at least a portion of the predetermined object, by matching one or more predetermined shapes to the predetermined object in the foreground portion of the image of the given frame;

a first coder for coding the determined region of interest, the first coder having a first coding error; and a second coder for coding at least a portion of the image of the given frame, which portion excludes the determined region of interest, the second coder having a second coding error, wherein said first coding error is smaller than said second coding error.

12. The video coder of claim 11 wherein the means for determining the region of interest comprises means for performing edge extraction on at least a portion of the image of the given frame to determine a shape of the predetermined object in the foreground portion of the image.

13. The video coder of claim 11 wherein the means for determining the foreground portion of the image of the given frame comprises means for comparing the image of the given frame with an image comprised in a frame previous to the given frame, and means for determining a portion of the image of the given frame which has moved relative to a corresponding portion of the frame previous to the given frame.

14. The video coder of claim 11 wherein the means for determining the foreground portion of the image of the given frame comprises means for determining one or more global motion estimation parameters based on a comparison of the image of the given frame with an image comprised in a frame previous to the given frame, means for determining a background portion of the image of the given frame, said background portion having exhibited motion in accordance with said one or more global motion estimation parameters as applied to a corresponding portion of the frame previous to the given frame, and means for determining the foreground portion of the image of the given frame based on the determined background portion.

15. The video coder of claim 11 further comprising means for determining one or more global motion estimation parameters based on a comparison of the image of the given frame with an image comprised in a frame subsequent to the given frame, means for determining a search region of the image of the frame subsequent to the given frame based on the determined region of interest of the image of the given frame and on said one or more global motion estimation parameters, means for automatically determining a region of interest of the frame subsequent to the given frame, said region of interest of the frame subsequent to the given frame including at least a portion of the predetermined object, by matching at least one of said one or more predetermined shapes to the predetermined object within the search region of the image of the subsequent frame, means for coding the determined region of interest of the image of the frame subsequent to the given frame with the first coder, and means for coding at least a portion of the image of the frame subsequent to the given frame, which portion excludes the determined region of interest of the image of the frame subsequent to the given frame, with the second coder.

16. The video coder of claim 11 further comprising means for determining one or more global motion estimation parameters based on a comparison of the image of the given frame with an image comprised in a frame subsequent to the given frame, means for selecting at least one of said one or more predetermined shapes based on the determined region of interest of the image of the given frame and on said one or more global motion estimation parameters, means for automatically determining a region of interest of the frame subsequent to the given frame, said region of interest of the frame subsequent to the given frame including at least a portion of the predetermined object, by matching the selected at least one of said one or more predetermined shapes to the predetermined object in the image of the subsequent frame, means for coding the determined region of interest of the image of the frame subsequent to the given frame with the first coder, and means for coding at least a portion of the image of the frame subsequent to the given frame, which portion excludes the determined region of interest of the image of the frame subsequent to the given frame, with the second coder.

17. The video coder of claim 11 further comprising means for determining one or more global motion estimation parameters based on a comparison of the image of the given frame with an image comprised in a frame subsequent to the given frame, means for determining a region of interest of the image of the frame subsequent to the given frame based on the determined region of interest of the image of the given frame and on said one or more global motion estimation parameters, means for coding the determined region of interest of the image of the frame subsequent to the given frame with the first coder, and means for coding at least a portion of the image of the frame subsequent to the given frame, which portion excludes the determined region of interest of the image of the frame subsequent to the given frame, with the second coder.

18. The video coder of claim 11 wherein the predetermined object comprises a person's head and wherein each of the one or more predetermined shapes comprises an ellipse.

19. The video coder of claim 11 wherein the predetermined object comprises a person's body and wherein each of the one or more predetermined shapes comprises an ellipse.

20. The video coder of claim 11 wherein the first coder comprises a waveform coder having a first quantizer and the second coder comprises a waveform coder having a second quantizer, the first quantizer providing a finer quantization than the second quantizer.

* * * * *